Patented Feb. 26, 1929.

1,703,324

UNITED STATES PATENT OFFICE.

PETER SELLEN, OF SEATTLE, WASHINGTON.

PROCESS OF PRESERVING FISH BAIT.

No Drawing. Application filed March 10, 1928. Serial No. 260,811.

This invention relates to improvements in processes for preserving organic matter, particularly fish eggs and the like preserved in a manner to permit them to be used for fish bait.

Experience has proven that fish eggs are an attractive bait for certain fish and that it is difficult to preserve such bait in a fresh condition.

The main object of the present invention is the provision of a process through the use of which fish eggs may be preserved in a more or less natural condition, such as texture, color and like characteristics, while at the same time the fish eggs are prevented from becoming too soft to permit them to remain on the hook.

The process consists in preparing a solution of water, formaldehyde, salt and sugar approximately in the proportions of one gallon of water, one tablespoonful of formaldehyde, one pound of salt, and one pound of sugar. The fresh fish eggs are placed in the solution in an open vessel and permitted to stand for approximately thirty days.

The solution and eggs are then subjected to a steam treatment, preferably by placing an open end of a steam conduit into the bottom of the vessel, the steam treatment being continued for a period determined by the degree of pulpiness of the eggs. This is tested during the treatment by removing an egg from time to time and testing its firmness by, for example, thrusting a fish hook through the same and subjecting the hook to action similar to that when the hook is drawn through the water as in fishing.

If, during the steam treatment, it is found that the eggs are not yielding to the treatment in a proper manner, a small additional quantity, say tablespoonful, of formaldehyde is added to the solution. When the eggs have reached the desired degree of inherent tenacity or rubberlike quality, the contents of the vessel are cooled, preferably by placing the vessel in a body of cool water.

Each fish egg contains a minute hole through the outer surface or skin of the egg which permits the solution during treatment to penetrate to the interior of the egg and cause a slight enlargement thereof. In practice, however, it has been demonstrated that the eggs are not subjected to similar enlargements under treatment and that, therefore, when the treatment is completed the eggs will be found of various sizes. After treatment, the eggs are separated according to size, as for example by passing the eggs over a sieve of predetermined apertures in order that the smaller eggs will pass through the apertures and the remaining eggs will be of substantially uniform size.

After thus selecting the eggs according to size, the selected mass is immersed in a syrup, preferably of a sugary type, heated to about the boiling point, deposited in cans and hermetically sealed against the air. The syrup treatment imparts to the eggs a uniform shiny appearance, rendering them more attractive as bait, this shiny appearance being in part due, it is believed, to the salt in the original solution.

When thus treated, the eggs will keep indefinitely or until desired for use, and if desired any sealing process which will hermetically seal the containers for the eggs may be used, though it has been found desirable to immerse such containers, after sealing, in the syrup solution in which the eggs are treated, thus utilizing the syrup to some extent as a further sealing medium.

What is claimed to be new is:

1. The process of preserving fish eggs, consisting of placing a solution of water, formaldehyde, salt and sugar into an open vessel, placing a quantity of fresh fish eggs into the solution and allowing the whole to stand for approximately thirty days, subjecting the solution and eggs to steam treatment, continuing the treatment to a period when the eggs have reached a rubbery-like consistency which will allow the point of a fish hook to readily penetrate the same but which will not permit the body of the hook to cut through the egg when the hook is drawn through the water as in fishing, separating the eggs so that eggs of uniform diameter will remain, immersing the eggs in a syrupy solution, and then hermetically sealing the eggs in containers.

2. The process of preserving fish eggs, consisting of placing a solution of water, formaldehyde, salt and sugar in the approximate proportion of one tablespoonful of formaldehyde, one pound of salt, one pound of sugar, and one gallon of water, placing fresh fish eggs into the solution and allowing it to stand for about thirty days, subjecting the solution to steam treatment and during the treatment testing the eggs from time to time and dropping in one tablespoonful of formaldehyde to assist the eggs in approaching a state of rubberiness which will allow them to be readily pierced by the point of a fish hook but will not allow the escape of the eggs from the hook as the hook is drawn through the water in a fishing operation, passing the eggs over a sieve so that eggs of uniform size will remain, immersing the eggs into a hot syrupy solution, and then hermetically sealing the eggs in a vessel.

In testimony whereof I affix my signature.

PETER SELLEN.